March 31, 1959   C. W. VAN RANST   2,879,871
SPEED RANGE DRIVE UNIT
Filed Nov. 26, 1954   2 Sheets-Sheet 1
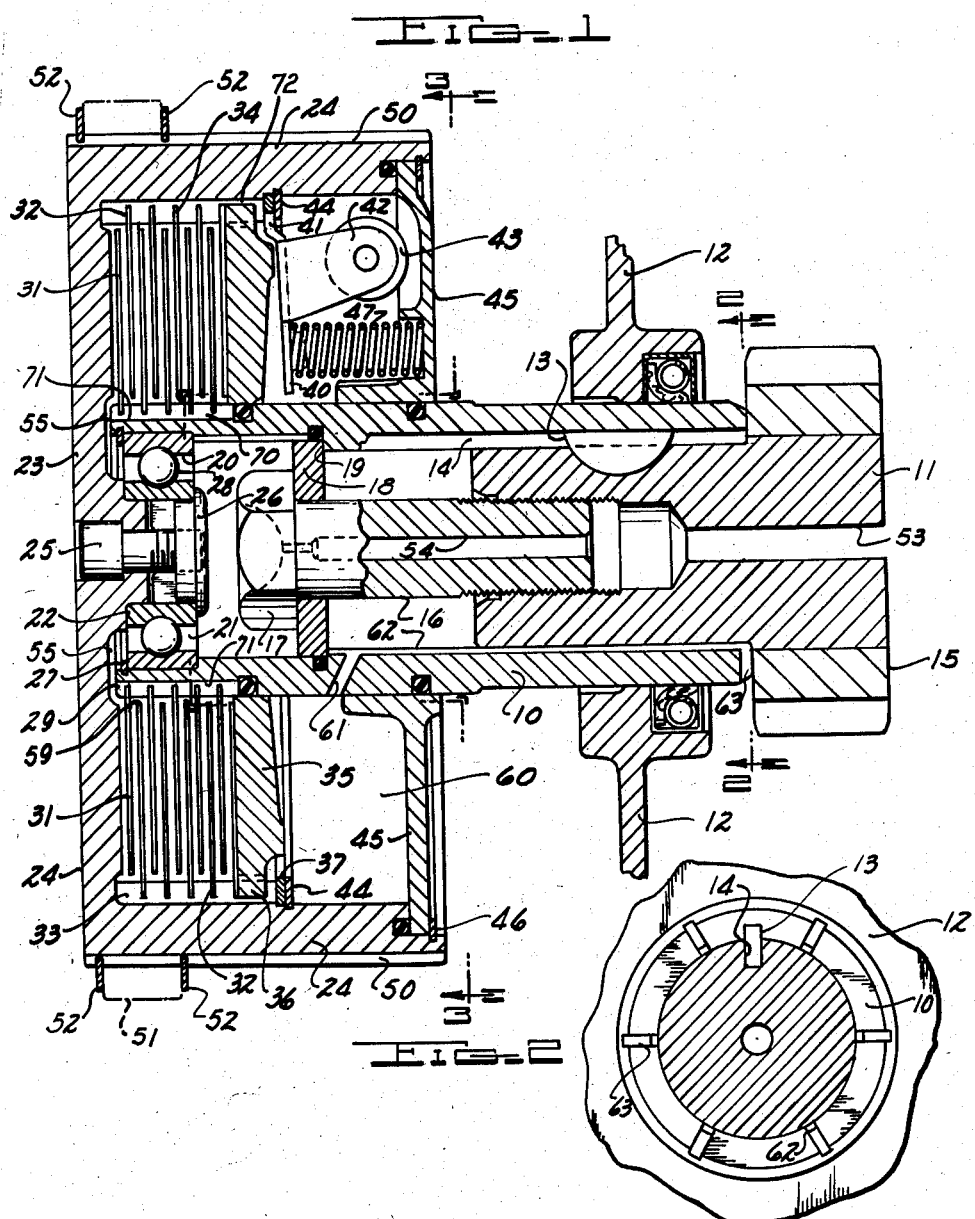
INVENTOR.
CORNELIUS W. VAN RANST
BY
SMITH, OLSEN & KOTTS
ATTORNEYS March 31, 1959  C. W. VAN RANST  2,879,871
SPEED RANGE DRIVE UNIT
Filed Nov. 26, 1954  2 Sheets-Sheet 2
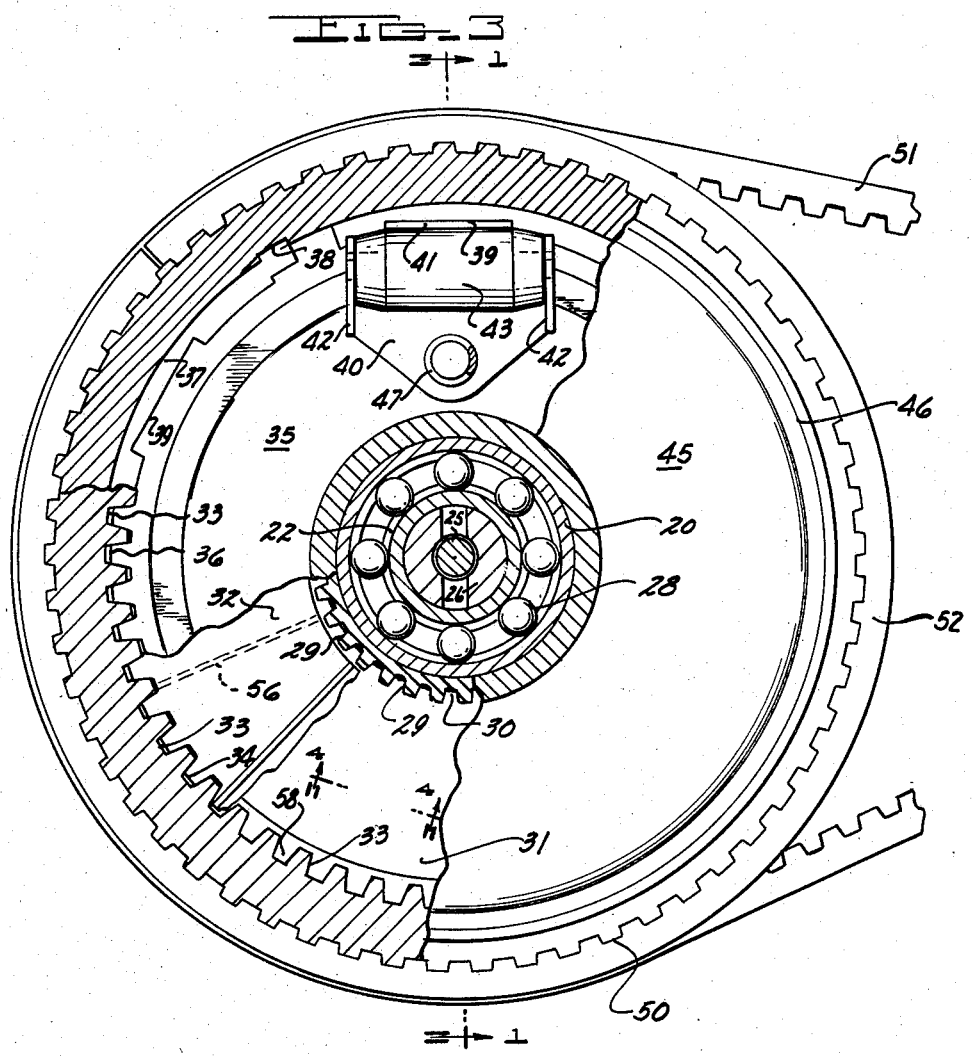
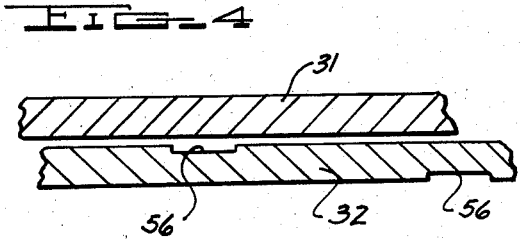
INVENTOR.
CORNELIUS W. VAN RANST
BY
SMITH, OLSEN & KOTTS
ATTORNEYS United States Patent Office 2,879,871
Patented Mar. 31, 1959

2,879,871

SPEED RANGE DRIVE UNIT

Cornelius W. Van Ranst, Dearborn, Mich.

Application November 26, 1954, Serial No. 471,303

10 Claims. (Cl. 192—104)

This invention relates to internal combustion engines and more particularly to driving mechanisms for engine accessories. The invention is in the nature of an improvement on the invention disclosed in United States Patent No. 2,079,724.

The invention disclosed in said Patent No. 2,079,724 is concerned with the problem of operating an engine accessory (such as a generator) at a constant maximum speed when the engine speed is increased beyond a predetermine r.p.m. Said invention proposes to solve this problem by employing a series of clutch disks between the engine and the accessory. A series of springs are provided to urge the clutch disks together and a series of weights are provided to overcome the action of the springs when the engine speed is increased beyond the predetermined r.p.m. When the engine is operating below the predetermined r.p.m. the clutch disks are urged by the springs into driving engagement with one another so as to rotate as a unit and impart rotational movements to the accessory in accordance with the speed of the engine. Each time the speed of the engine is increased beyond the predetermined r.p.m. the weights are automatically subjected to increased centrifugal forces. The weights are thereby moved to overcome the action of the springs and the clutch disks are allowed to slip on one another so as to limit the speed of the accessory at a constant maximum value.

In order to prevent scoring of the clutch disks (as well as to provide a driving medium between adjacent ones of the disks) it has been found desirable to provide a thin film of oil between the disks. The invention disclosed in the aforementioned Patent No. 2,079,724 utilizes the oil from the engine's lubricating system as the source for the necessary film of oil. It is necessary that the oil be constantly circulated through the spaces between the disks. Otherwise the oil will overheat and deteriorate. For purposes of circulating the oil the disks are provided with a series of apertures. Unfortunately the apertures in the disks were found to direct the oil unevenly over the faces of the disks.

The present invention proposes to employ, as an alternative to the aforementioned apertures, a series of radial grooves. These grooves cause the oil to be directed along the entire radial length of each disk. The result is that each disk is provided with a thin film of oil and there is no danger that any of the disk faces will heat up and become scored.

One undesirable limitation found to exist with mechanisms constructed according to the invention disclosed in Patent No. 2,079,724 lies in the fact that those mechanisms were not adapted for installation in more than one make or model of automobile. Thus, for each different make of automobile there was required a redesigning of the entire accessory driving mechanism. The present invention was envisioned, at least in part, with the aim of providing an accessory drive mechanism which could be utilized in many different automobiles with a minimum of parts replacement and redesign. To this end the present accessory drive mechanism has been so designed that it has but one element in direct communication with the automobile engine. The mechanism can thereby be adapted for association with different automobiles by merely replacing this one element. The present invention utilizes in the illustrated embodiment a pair of relatively movable telescoping hub members between which are received the aforementioned clutch disks. The inner hub is the only element in direct communication with the automobile engine. The outer hub is supported entirely by the inner hub, its only connection with the conventional elements of the automobile engine being through a conventional belt or chain. The outer hub has its entire outer surface contoured to make driving engagement with the belt or chain. Thus, if the drive mechanism is to be used for driving a generator and the generator is positioned in different axial locations within different automobiles, the drive mechanism may be accommodated to the various different generator locations by simply repositioning the belt or chain at the necessary axial position on the outer hub.

Between the outer and inner hubs there is preferably provided a ball bearing assembly. The mechanism is so designed that this bearing assembly is automatically provided with lubricant from the engine lubricating system. The design is such that the bearing assembly is positioned between the lubricating system and clutch disks. Therefore lubricant from the lubricating system must pass through the bearing assembly before it passes between the clutch disks.

The invention has for its primary object to provide an accessory drive mechanism having an increased range of usefulness over prior type mechanisms.

As an aid in attaining the above mentioned primary object a further object of the invention is to provide an accessory drive mechanism having improved means for increasing the useful life of the clutch disks. Toward this end the invention provides an improved lubricant circulation mechanism.

As a further object in aid of realizing the primary object, it is desired to provide an accessory drive mechanism which can be economically utilized with a variety of different automobile engines. This object is achieved by so designing the mechanism that it has but one element in direct communication with the engine. Adjustment to different engines can thereby be effected by merely replacing this one element.

Other objects of this invention will appear in the following description and appended claims, reference being had to the accompanying drawings forming a part of this specification wherein like reference characters designate corresponding parts in the several views.

In the drawings:

Figure 1 is a sectional view of a preferred form of the invention taken substantially on line 1—1 of Figure 3.

Figure 2 is a sectional view taken on line 2—2 of Figure 1.

Figure 3 is a sectional view taken substantially on line 3—3 of Figure 1.

Figure 4 is a sectional view taken on line 4—4 of Figure 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings the illustrated accessory drive mechanism will be seen to include a cylindrical sleeve or hub member 10. This hub member is rotatably mounted on a web member 12 which is formed as an integral part of the automobile engine (not shown). Hub member 10 is keyed to a shaft 11 by means of a key 13 and a keyway 14. The right end of shaft 11 has fixed thereto a timing gear 15 which serves to translate movement of the engine into rotary movement of member 10.

Shaft 11 is secured against axial movement in member 10 by means of a bolt 16, the head 17 of which abuts against one face of a plate 18. The other face of plate 18 abuts against a peripheral shoulder 19 formed on hub member 10.

The left end of hub member 10 is provided with a snap ring 27 for fixedly retaining one race element 20 of a ball bearing assembly 21. Another race element 22 is fixedly secured on a radial wall 23 of a hub member 24 by means of a bolt 25 and nut 26. Between race elements 20 and 22 there are positioned anti-friction elements 28. The ball bearing assembly 21 provides for relative movement between hub members 10 and 24.

Between the outer face of hub member 10 and the inner face of hub 24 there are positioned a series of clutch disks 31 and 32. Disks 31 are slidably positioned on hub 10 and disks 32 are slidably positioned on hub 24. Positioning of disks 31 on member 10 is effected by means of axially extending grooves 29 formed on the outer face of member 10 and a series of teeth 30 formed on the inner peripheries of the disks. Positioning of disks 32 on member 24 is effected by means of axially extending grooves 33 formed on the inner face of member 24 and a series of teeth 34 extending from the outer peripheries of the disks.

Disks 31 and 32 are held in close relation by a plate 35. Plate 35 is preferably made to slide on hub 24 and for this reason said plate is provided with a series of teeth 36 which are slidably engaged in grooves 33. To the right of plate 35 there is provided a ring 37, the external face of which is provided with a lug 38 (Figure 3) for the securement of said ring in hub 24. The internal face of ring 37 is provided with six notches 39 for rockably receiving the end portions 41 of six plates 40. A snap ring 44 retains each of portions 40 against movement out of its notch 39. A pair of arms 42 extend from each plate 40 and serve to mount a weight 43. To the right of weights 43 there is provided a cover plate 45 fixedly secured on hub 24 by a snap ring 46. Between plate 45 and each of plates 40 there is positioned a compression spring 47, the purpose of which is to react against plate 40 and thereby force plate 35 to push disks 31 and 32 together. Actually, plates 31 and 32 are much closer together than would appear from Figure 1.

The outer face of hub 24 is provided with a series of teeth 50 which are adapted to mesh with a belt or chain 51 leading to the drive shaft of an automobile generator (not shown). It will be noted that teeth 50 extend along the entire outer arcuate surface of hub 24. It is thereby possible to position belt 51 in any desired axial position on hub 24. Thus, if the automobile is of the type wherein the generator is positioned to the left of hub 24 belt 51 would be trained over hub 24 at its left end. If the generator is positioned further to the right in the automobile the belt could be moved a corresponding amount toward the right end of hub 24. In order that belt 51 be guided in its movement around the axis of hub 24, a pair of snap rings 52 are frictionally engaged over the hub. Rings 52 can of course be repositioned at different points on hub 24 in accordance with the desired position of belt 51.

Operation of the mechanism is such that when the automobile engine is operating below a predetermined r.p.m. disks 31 and 32 will be pushed (by the action of springs 47) into close non-slip relation. The effect is that hubs 10 and 24 will rotate together as a unit. To provide a positive drive between the automobile engine and generator. Each time the speed of the engine is increased beyond the predetermined r.p.m. weights 43 are automatically subjected to increased centrifugal forces. The weights are thereby moved outwardly to overcome the force of springs 47 and allow plate 35 to slide slightly to the right (as seen in Figure 1). The effect is that disks 31 and 32 slip on one another so as to limit the speed of hub 24 and belt 51.

It was stated earlier that the invention envisioned mechanism for supplying a thin film of oil between the clutch disks. For this purpose there is provided in shaft 11 an oil passage 53 in communication with the engine lubricating system (not shown). Passage 53 leads to a passage 54 extending through bolt 16. Passages 53 and 54 allow oil from the lubricating system to pass between adjacent ones of anti-friction elements 28 and into an annular passage 55 formed between the inner face of wall 23 and the left end of member 10. From passage 55 the lubricant passes into an annular passage 70 formed between the outer surface 71 of hub 10 and the inner edges of disks 31, 32. Each of disks 32 is provided with a series of eight equally spaced radial grooves 56 on one or preferably both faces. If desired disks 31 could be provided with grooves on their faces and each of disks 32 could be made without any grooves, the only requirement being that radially-extending passages be provided between adjacent disks. As the lubricant travels along in annular passage 70 centrifugal force throws it into radial grooves 56. When it reaches the outer limits of grooves 56 it passes into an annular passage 58 formed by the outer peripheries of disks 31, 32 and the walls of grooves 33. It is then directed into passages 72 formed between the outer periphery of plate 35 and the walls of grooves 33, from where it is forced into chamber 60 formed between plates 35 and 45. From chamber 60 it is directed into a series of eight circular passages 61 formed in hub member 10. While the lubricant is in grooves 56 it is in position to be directed over the entire faces of disks 31 and 32. Assume, for example, that the speed of the automobile engine is increased beyond the aforementioned predetermined r.p.m. Disks 31 will move faster than disks 32 and the lubricant in passages 56 will thereby contact the disk faces as disks 31 move past disks 32. In practice the entire disk faces will always be provided with a thin film of oil.

After the lubricant has passed from passages 56, through chamber 60 and passages 61, it is directed into a series of eight axially extending passages 62 cut in the inner face of hub 10. Passages 62 lead to short passages 63 which serve to exhaust the lubricant back to the engine lubricating system.

The above described construction whereby lubricant is directed through bearing assembly 21 and onto the faces of disks 31 and 32 is considered particularly advantageous in that the bearing assembly is automatically lubricated and the disks are prevented from scoring or overheating.

Another advantage of the above described construction lies in the fact that the mechanism has only hub 10 in direct communication with the automobile engine. The mechanism can thereby be adapted for association with different automobiles by merely replacing this one hub.

The structural relationships whereby these advantages are realized are set forth in the following claims.

I claim:

1. In an engine the combination of an accessory drive mechanism including a clutch having two relatively movable telescoping hubs, the outer hub being provided with a plurality of external axially directed grooves extending over its full axial length to define a plurality of gear teeth, a pair of spaced snap rings frictionally engaged over the gear teeth to define a pair of belt-confining walls, the position of the snap rings with respect to the axial length of the outer hub being determined by the relative axial position of the element being driven by the belt, the inner peripheries of said snap rings having teeth in mesh with said gear teeth so that said rings can be moved axially on said outer hub to selected positions.

2. In an engine having a pressure lubricating system, the combination comprising two relatively movable telescoping hubs, the inner hub being journalled in the engine block and the outer hub being external of the latter, a bearing assembly between the interior face of the inner hub and a radial face of the outer hub, clutch disks arranged in parallel relation between the inner and outer hubs, every other disk being fixed to rotate with the inner hub and the remaining disks being fixed to rotate with the outer hub, fluid passage means forming a closed circuit between the lubricating system and bearing assembly, fluid passage means between the bearing assembly and one of the endmost disks, fluid passage means at the inner limits of said remaining disks, radially-extending passage means between adjacent disks, fluid passage means at the outer limits of said disks, and fluid passage means forming a closed circuit between the other endmost disk and lubricating system, whereby oil from the lubricating system will pass through the bearing assembly and in radial directions between each of the neighboring disks before it returns by a closed circuit to the lubricating system.

3. In an engine having a pressure lubricating system, an accessory drive mechanism comprising a hollow drum-shaped member closed at its forward end and having an aperture at its rear end, a shaft member telescopingly fitting in said aperture in liquid tight relation and rotatable with respect to said drum-shaped member, a bearing assembly on the forward end of said shaft member for supporting said drum-shaped member, clutch disks in the latter arranged in parallel relation, every other disk being fixed to rotate with one of the telescoping members and the other disks being fixed to rotate with the other member, conduit means in said shaft member for directing oil from said pressure lubricating system through said bearing to the radially inner edges of said disks, other conduit means in said shaft in fluid communication with the radially outer edges of said disks for returning oil to said pressure lubricating system, and means responsive to engine speed for regulating the spacing of said disks above a predetermined speed of the engine.

4. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, a bearing assembly on the forward end of said shaft member for supporting said drum-shaped member, clutch disks in said drum-shaped member arranged in parallel relation, every other disk being fixed to rotate with one of the telescoping members and the other disks being fixed to rotate with the other member, conduit means in said shaft member for directing oil from said pressure lubricating system through said bearing to the radially inner edges of said disks, other conduit means in said shaft member in fluid communication with the radially outer edges of said disks for returning oil to said pressure lubricating system, means responsive to engine speed for regulating the spacing of said disks above a predetermined speed of the engine, and means on the outer surface of said drum-shaped member for drivingly connecting the latter to accessories designed to be operated at predetermined speeds.

5. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation, every other disk being fixed to rotate with one of the telescoping members and the other disks being fixed to rotate with the other member, said shaft member being hollow, an accessory drive shaft extending into the end of said shaft member, within said shaft member means for attaching the shaft member to said accessory drive shaft, conduit means in said shaft member for directing oil from said pressure lubricating system to the radially inner edges of said disks, other conduit means in said shaft member in fluid communication with the radially outer edges of said disks for returning oil to said pressure lubricating system, and means responsive to engine speed for regulating the spacing of said disks above a predetermined speed of the engine.

6. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation with at least half of such disks having radial grooves, every other disk being fixed to rotate with one of the telescoping members and the other disks being fixed to rotate with the other member, conduit means in said shaft member for directing oil from said pressure lubricating system to the radially inner edges of said disks, other conduit means in said shaft member in fluid communication with the radially outer edges of said disks for returning oil to said pressure lubricating system, and means responsive to engine speed for regulating the spacing of said disks above a predetermined speed of the engine.

7. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation, every other disk being fixed to rotate with one of the telescoping members and the other disks being fixed to rotate with the other member, said shaft member extending into the drum-shaped member substantially to the forward end of the latter, a bearing operably disposed between the forward ends of the shaft and drum-shaped member for rotatably carrying the latter, conduit means extending longitudinally through said shaft member for directing oil from said presssure lubricating system through said bearing to the radially inner edges of said disks, other conduit means in said shaft member in fluid communication with the radially outer edges of said disks for returning oil to said pressure lubricating system, said other conduit means including ducts extending radially inwardly and thereafter rearwardly in said shaft member for discharging the oil adjacent the rear end of said shaft member, and means responsive to engine speed for regulating the spacing of said disks above a predetermined speed of the engine.

8. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, clutch disks in the latter arranged in parallel relation, every other disk being fixed to rotate with one of the telescoping members and the other disks being fixed to rotate with the other member, said shaft member extending into the drum-shaped member substantially to the forward end of the latter, conduit means extending longitudinally through said shaft member for directing oil from said pressure lubricating system to the radially inner edges of said disks, other conduit means in said shaft member in fluid communication with the radially outer edges of said disks for returning oil to said pressure lubricating system, said other conduit means including ducts extending radially inwardly and thereafter rearwardly in said shaft member for discharging the oil adjacent the rear end of said shaft member, and means responsive to engine speed for regulating the spacing of said disks above a predetermined speed of the engine.

9. In an engine having a pressure lubricating system, an accessory drive mechanism comprising a hollow drum-shaped member closed at its forward end and having an aperture in its rear, a shaft member telescopingly fitting in said aperture in liquid tight relation and rotatable with respect to said drum-shaped member, clutch disks in the latter arranged in parallel relation with alternate disks being fixed to rotate with one of the telescoping members and the other disks being fixed to rotate with the other member, said shaft member extending into the drum-shaped member substantially to the forward end of the latter, means mounted in said drum-shaped member responsive to engine speed for regulating the spacing of said disks above a predetermined speed of the engine, said means including an annular pressure plate slidable axially in liquid tight relation on said shaft member for urging said disks together toward one end of said drum-shaped member, said shaft member having a pair of passageways communicating with said pressure lubricating system and extending longitudinally in the shaft member and opening to the interior of said drum-shaped member with one of said passageways opening on one side of said annular pressure plate and the other passageway opening on the other side of said pressure plate, said passageway which opens on the side adjacent said disks being connected to the high pressure side of the lubricating system so that a closed oil flow circuit extends from that passageway to the inner edges of said disks, radially outwardly therefrom between the disks, in an axial direction beyond said annular pressure plate, radially inward to said other passageway and back to the lubricating system.

10. In an engine having a pressure lubricating system, an accessory drive mechanism comprising a hollow drum-shaped member closed at its forward end and having an aperture in its rear end, a shaft member telescopingly fitting in said aperture in liquid tight relation and rotatable with respect to said drum-shaped member, said shaft member extending into the drum-shaped member a substantial distance, clutch disks carried in parallel relation in one end of the drum-shaped member with alternate disks fixed to rotate with one of the telescoping members and the other disks being fixed to rotate with the other member, transverse annular partition means in said drum-shaped member intermediate said disks and the other end of said drum-shaped member providing an annular opening between the outer periphery of the partition means and the wall of said drum-shaped member, other means in said drum-shaped member responsive to engine speed for regulating the spacing of said disks in accordance with the speed of said engine, said shaft member having a pair of passageways communicating at their rear ends with said pressure lubricating system and extending longitudinally in the shaft member and opening at their forward ends to the interior of said drum-shaped member on opposite sides respectively of said partition, said passageway which opens into said one end of the drum-shaped member being in direct communication with the high pressure side of the lubricating system so that a closed circuit for oil flow extends from that passageway to said one end of the drum-shaped member, radially outwardly between said disks, axially through said annular opening, radially outwardly and through the other passageway and back to the lubricating system.

References Cited in the file of this patent
UNITED STATES PATENTS

| | | |
|---|---|---|
| 1,422,360 | Hughes | July 11, 1922 |
| 1,556,706 | Moorhouse | Oct. 13, 1925 |
| 1,702,116 | Hoffman | Feb. 12, 1929 |
| 1,901,988 | Rudquist | Mar. 21, 1933 |
| 1,928,301 | Pierson | Sept. 26, 1933 |
| 2,054,377 | Havill et al. | Sept. 15, 1936 |
| 2,079,724 | Van Ranst | May 11, 1937 |
| 2,412,114 | Zonis | Dec. 3, 1946 |
| 2,465,570 | Bocchino | Mar. 29, 1949 |
| 2,576,156 | Trofimor | Nov. 22, 1951 |
| 2,728,429 | Kershner | Dec. 27, 1955 |